United States Patent
Ishizuka et al.

(10) Patent No.: US 10,688,755 B2
(45) Date of Patent: Jun. 23, 2020

(54) STEEL SHEET FOR A FUEL TANK

(71) Applicant: NIPPON STEEL & SUMITOMO METAL CORPORATION, Tokyo (JP)

(72) Inventors: Kiyokazu Ishizuka, Tokyo (JP); Noriyuki Maekawa, Tokyo (JP); Hiroaki Uramoto, Tokyo (JP); Masahiro Fuda, Tokyo (JP); Ikuro Yamaoka, Tokyo (JP); Kenichiro Matsumura, Tokyo (JP)

(73) Assignee: NIPPON STEEL CORPORATION, Tokyo (JP)

( * ) Notice: Subject to any disclaimer, the term of this patent is extended or adjusted under 35 U.S.C. 154(b) by 228 days.

(21) Appl. No.: 15/545,116

(22) PCT Filed: Dec. 1, 2016

(86) PCT No.: PCT/JP2016/052911
§ 371 (c)(1),
(2) Date: Jul. 20, 2017

(87) PCT Pub. No.: WO2016/125740
PCT Pub. Date: Aug. 11, 2016

(65) Prior Publication Data
US 2017/0361571 A1 Dec. 21, 2017

(30) Foreign Application Priority Data
Feb. 3, 2015 (JP) .................................. 2015-019368

(51) Int. Cl.
*B32B 15/18* (2006.01)
*B32B 15/04* (2006.01)
(Continued)

(52) U.S. Cl.
CPC .............. *B32B 15/015* (2013.01); *B32B 1/02* (2013.01); *B32B 15/04* (2013.01); *B32B 15/18* (2013.01);
(Continued)

(58) Field of Classification Search
None
See application file for complete search history.

(56) References Cited

U.S. PATENT DOCUMENTS

| 5,380,585 A | 1/1995 | Ogawa et al. |
| 6,143,422 A | 11/2000 | Nagai et al. |

FOREIGN PATENT DOCUMENTS

| CN | 102227517 A | 10/2011 |
| EP | 0844316 A1 | 5/1998 |

(Continued)

OTHER PUBLICATIONS

English machine translation of Morishita (WO 2010/061964), EPO, accessed Apr. 19, 2019.*

(Continued)

*Primary Examiner* — Xiaobei Wang
(74) *Attorney, Agent, or Firm* — Birch, Stewart, Kolasch & Birch, LLP

(57) ABSTRACT

A steel sheet for a fuel tank includes: a Zn—Ni alloy plated layer which is placed on one surface or each of both surfaces of a base metal and formed on at least one surface; and an inorganic chromate-free chemical conversion coating film which is placed over the Zn—Ni alloy plated layer. The Zn—Ni alloy plated layer has a crack starting from an interface between the Zn—Ni alloy plated layer and the inorganic chromate-free chemical conversion coating film and reaching an interface between the Zn—Ni alloy plated layer and the steel sheet, and a water contact angle on a (Continued)

surface of the inorganic chromate-free chemical conversion coating film is more than or equal to 50 degrees.

8 Claims, 1 Drawing Sheet

(51) Int. Cl.
  *B32B 15/08*   (2006.01)
  *C25D 7/00*   (2006.01)
  *C23C 28/00*   (2006.01)
  *B60K 15/03*   (2006.01)
  *B32B 15/01*   (2006.01)
  *B32B 1/02*   (2006.01)
  *C25D 5/48*   (2006.01)
  *B65D 85/84*   (2006.01)
  *C23C 28/02*   (2006.01)
  *C23C 22/78*   (2006.01)
  *C23C 22/42*   (2006.01)
  *C23C 22/60*   (2006.01)
  *C23C 22/44*   (2006.01)
  *C23C 22/36*   (2006.01)
  *C23C 22/07*   (2006.01)
  *C23F 17/00*   (2006.01)
  *C25D 3/56*   (2006.01)

(52) U.S. Cl.
  CPC ............. *B60K 15/03* (2013.01); *B65D 85/84* (2013.01); *C23C 22/07* (2013.01); *C23C 22/361* (2013.01); *C23C 22/42* (2013.01); *C23C 22/44* (2013.01); *C23C 22/60* (2013.01); *C23C 22/78* (2013.01); *C23C 28/00* (2013.01); *C23C 28/021* (2013.01); *C23C 28/023* (2013.01); *C23C 28/025* (2013.01); *C23C 28/321* (2013.01); *C23C 28/322* (2013.01); *C23C 28/3225* (2013.01); *C23F 17/00* (2013.01); *C25D 3/565* (2013.01); *C25D 5/48* (2013.01); *C25D 7/00* (2013.01); *B60K 2015/03486* (2013.01); *C23C 2222/20* (2013.01)

(56) References Cited

FOREIGN PATENT DOCUMENTS

| | | | |
|---|---|---|---|
| JP | 5-25679 | A | 2/1993 |
| JP | 5-86353 | A | 4/1993 |
| JP | 5-106058 | A | 4/1993 |
| JP | 9-324279 | A | 12/1997 |
| JP | 9-324280 | A | 12/1997 |
| JP | 9-324281 | A | 12/1997 |
| JP | 9-324282 | A | 12/1997 |
| JP | 11-350186 | A | 12/1999 |
| JP | 2004-84499 | A | 3/2004 |
| JP | 2004-169122 | A | 6/2004 |
| JP | 2005-68511 | A | 3/2005 |
| JP | 2007-186745 | A | 7/2007 |
| JP | 2011-38139 | A | 2/2011 |
| JP | 2013-133527 | A | 7/2013 |
| JP | 2013-227646 | A | 11/2013 |
| KR | 10-1999-0036135 | A | 5/1999 |
| KR | 10-2011-0083686 | A | 7/2011 |
| WO | WO 97/46733 | A1 | 12/1997 |
| WO | WO 2007/011008 | A | 1/2007 |
| WO | WO 2010/061964 | A1 | 6/2010 |

OTHER PUBLICATIONS

Extended European Search Report, dated Mar. 22, 2018, for corresponding European Application No. 16746571.5.
Korean Office Action and partial English translation for corresponding Application No. 10-2017-7020670, dated May 4, 2018.
Chinese Office Action and Search Report for corresponding Chinese Application No. 201680007528.9, dated Sep. 29, 2018, with partial English translation.
1st Office Action for JP 2016-533732 dated Aug. 2, 2016.
1st Office Action for TW 105103301 dated Aug. 16, 2016.
International Search Report for PCT/JP2016/052911 dated Mar. 22, 2016.
Written Opinion of the International Searching Authority for PCT/JP2016/052911 (PCT/ISA/237) dated Mar. 22, 2016.
Indian Office Action for corresponding Indian Application No. 201717026399, dated Apr. 8, 2019, with English translation.
Brazilian Office Action for corresponding Brazilian Application No. 112017012657-5, dated Feb. 4, 2020, with partial English translation.
Indonesian Office Action for corresponding Indonesian Application No. P00201704928, dated Feb.17, 2020, with English translation.

* cited by examiner

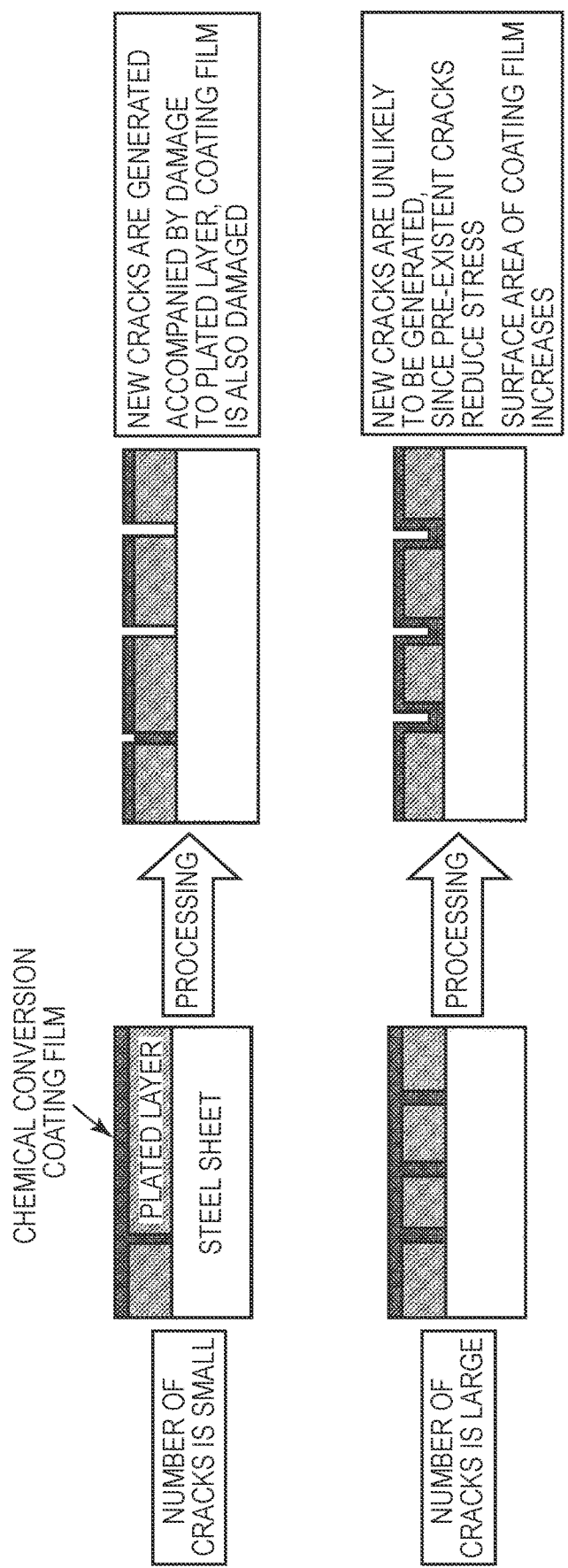

STEEL SHEET FOR A FUEL TANK

TECHNICAL FIELD

The present invention relates to a steel sheet for a fuel tank.

BACKGROUND ART

With tightening environmental regulation in recent years, market needs for materials that do not contain harmful metals have been increased. In the field of automobiles, the switching from a lead-tin alloy plated steel sheet, which has been a main ingredient of fuel tanks, to a material not containing lead has been promoted. To a unique required performance of the fuel tanks, which is high inner corrosion resistance under the environment in which a fuel is enclosed (hereinafter, also referred to as fuel corrosion resistance), many suggestions are given involving using zinc-based plated steel sheets, which achieve steady success as inner and outer sheets of automobiles (for example, see the following Patent Literatures 1 to 3).

The technologies using zinc-based plated steel sheets described above each have an assumption that chromate treatment is performed, and therefore are incompatible with the recent market needs for not using harmful metals. For this reason, as described in the following Patent Literatures 4 to 9, a chromate-free zinc-based plated steel sheet that does not contain chromium for a fuel tank is disclosed.

CITATION LIST

Patent Literature

Patent Literature 1: JP H5-106058A
Patent Literature 2: JP H9-324279A
Patent Literature 3: JP H9-324281A
Patent Literature 4: JP 2004-169122A
Patent Literature 5: JP 2007-186745A
Patent Literature 6: JP 2013-133527A
Patent Literature 7: JP 2013-227646A
Patent Literature 8: JP 2011-38139A
Patent Literature 9: WO2007/011008

SUMMARY OF INVENTION

Technical Problem

However, compared to the fuel corrosion resistance of the conventional zinc-based plated steel sheet subjected to the chromate treatment, the fuel corrosion resistance of the chromate-free zinc-based plated steel sheets disclosed in the Patent Literatures 4 to 9 are not sufficient in fuel corrosion resistance under a severer conditions (for example, corrosion resistance over a longer time period, and corrosion resistance in the case where damage in the coating film has occurred during processing), and requires further improvement.

For example, Patent Literatures 4 and 5 each disclose a chromate-free coating film mainly containing an organic resin. However, when such a chromate-free coating film mainly containing an organic resin is exposed to a fuel environment for a long time period, the organic resin is swelled by the fuel, and adhesion between surfaces of plating decreases. It is assumed that such swelling of the organic resin is a factor in insufficient corrosion resistance.

Patent Literatures 6 and 7 each disclose a phosphoric acid-based inorganic chromate-free coating film. However, the phosphoric acid-based inorganic chromate-free coating film does not necessarily have sufficient water resistance, and lacks corrosion resistance in particular in the case where a fuel contains dew condensation water.

Patent Literature 8 describes that a chromate-free chemical conversion treated layer is formed on a zinc-nickel alloy plated layer having a crack. However, the chemical conversion treated layer mainly contains a urethane-based aqueous resin, and is improved in corrosion resistance, but is not imparted with the corrosion resistance with respect to deteriorated gasoline. Further, as will be described later, phosphoric acid, vanadium, titanium, and zirconium contained in the chemical conversion treated film are not sufficient for imparting the corrosion resistance with respect to deteriorated gasoline.

Patent Literature 9 discloses a steel sheet obtained by coating a zinc-based plated steel sheet with an aqueous metal surface treatment agent containing an organosilicon compound. However, the steel sheet is improved in corrosion resistance, but is not imparted with corrosion resistance with respect to deteriorated gasoline.

Accordingly, the present invention has been made in view of the above problems, and the present invention aims to provide a steel sheet for a fuel tank, which can exhibit excellent corrosion resistance under an environment in which various fuels exist, the fuels including a fuel containing an organic acid such as deteriorated gasoline and a fuel containing dew condensation water in addition to an organic acid, without using environmental burden substances such as lead and chromium.

Solution to Problem

The inventors of the present invention have investigated improvement in fuel corrosion resistance in a chromate-free zinc-based plated steel sheet, and have found that remarkable improvement can be obtained by making a zinc-based plated layer to be a Zn—Ni alloy plated layer, forming a predetermined crack on the plated layer, making a chromate-free chemical conversion coating film to mainly contain inorganic substances, and imparting a surface of the coating film with water repellency.

The gist of the present invention accomplished on the basis of the above finding is as follows.

(1)

A steel sheet for a fuel tank, including:

a Zn—Ni alloy plated layer which is placed on one surface or each of both surfaces of a base metal and formed on at least one surface; and an inorganic chromate-free chemical conversion coating film which is placed over the Zn—Ni alloy plated layer, in which the Zn—Ni alloy plated layer has a crack starting from an interface between the Zn—Ni alloy plated layer and the inorganic chromate-free chemical conversion coating film and reaching an interface between the Zn—Ni alloy plated layer and the steel sheet, and a water contact angle on a surface of the inorganic chromate-free chemical conversion coating film is more than or equal to 50 degrees.

(2)

The steel sheet for a fuel tank according to (1), in which one surface of the base metal has the Zn—Ni alloy plated layer and the inorganic chromate-free chemical conversion coating film, and a surface opposite to the one surface does not have the Zn—Ni alloy plated layer and the inorganic chromate-free chemical conversion coating film.

(3)

The steel sheet for a fuel tank according to (2), in which a water contact angle on the surface not having the Zn—Ni alloy plated layer and the inorganic chromate-free chemical conversion coating film is less than 10 degrees.

(4)

The steel sheet for a fuel tank according to (2) or (3), in which a deposition amount of Zn and/or Ni on the surface not having the Zn—Ni alloy plated layer and the inorganic chromate-free chemical conversion coating film is 0.01 to 0.5 g/m$^2$.

(5)

The steel sheet for a fuel tank according to any one of (1) to (4), in which the inorganic chromate-free chemical conversion coating film contains one or more selected from a silane coupling agent, a condensation polymer of a silane coupling agent, silica, silicate, phosphoric acid, and phosphate, and a compound of one or more metals selected from Ti, Zr, V, Mo, and W.

(6)

The steel sheet for a fuel tank according to any one of (1) to (5), in which the inorganic chromate-free chemical conversion coating film contains a water repellent.

(7)

The steel sheet for a fuel tank according to (6), in which the water repellent is one or more selected from polyolefin wax, a silicon-based resin, and a fluorine-based resin.

(8)

The steel sheet for a fuel tank according to any one of (1) to (7), in which in the case where a cross section of the Zn—Ni alloy plated layer is observed, the number of the cracks in a visual field of 100 µm is more than or equal to 5 and less than or equal to 50.

(9)

The steel sheet for a fuel tank according to (8), in which the number X of the cracks in a visual field of 100 µm obtained by observing the cross section of the Zn—Ni alloy plated layer and the water contact angle Y (degrees) satisfy a relationship represented by the following formula (I), $$Y \geq -0.18X + 56.5 \qquad (I).$$

(10)

The steel sheet for a fuel tank according to (9), in which in the case where a cross section of the Zn—Ni alloy plated layer is observed, the number of the cracks in the visual field of 100 µm is more than or equal to 5 and less than 50, and a maximum width of a crack is less than 0.5 µm.

Advantageous Effects of Invention

As described above, according to the present invention, there can be provided a steel sheet for a fuel tank, which exhibits excellent corrosion resistance under an environment in which various fuels exist, the fuels including a fuel containing an organic acid such as deteriorated gasoline and a fuel containing dew condensation water in addition to an organic acid, without using environmental burden substances such as lead and chromium.

BRIEF DESCRIPTION OF DRAWINGS

FIG. 1 is an explanatory view of a relationship of Expression (I) showing a comparison between a case where the number of cracks is small (few cracks) and a case where the number of cracks is large (many cracks).

DESCRIPTION OF EMBODIMENTS

Hereinafter, preferred embodiments of the present invention will be described in detail.

The present invention described below in detail relates to a steel sheet for a fuel tank that uses a zinc-based plated steel sheet which is excellent in corrosion resistance to various fuels, does not use lead or chromate treatment, and is environmentally friendly. The present invention also relates to a steel sheet used for an automobile, a motorcycle, industrial machinery, and construction machinery, and in addition, used for a tank in which a fuel is enclosed and a part of the tank.

The steel sheet for a fuel tank according to an embodiment of the present invention includes: a Zn—Ni alloy plated layer which is placed on one surface or each of both surfaces of a base metal; and an inorganic chromate-free chemical conversion coating film (hereinafter, also simply referred to as "chemical conversion coating film") which is placed over the Zn—Ni alloy plated layer (hereinafter, also simply referred to as "plated layer").

In the case where the steel sheet for a fuel tank according to an embodiment of the present invention is used for a steel sheet for a fuel tank, a surface (one surface) having the Zn—Ni alloy plated layer and the inorganic chromate-free chemical conversion coating film which is placed over the Zn—Ni alloy plated layer is a fuel tank-inner surface (hereinafter, referred to as inner surface). In that case, the surface opposite to the one surface is a fuel tank-outer surface (hereinafter, referred to as outer surface).

In the steel sheet according to the present invention, the Zn—Ni alloy plated layer may be provided to each of the both surfaces. However, in order to make the weldability of the steel sheet satisfactory, it is preferred that the surface to be the outer surface of the fuel tank do not have the plated layer. Further, for example, in the case where the steel sheet is used as a fuel tank for a motorcycle which places importance on the visual quality of the coating of the outer surface of the fuel tank, it is preferred that the outer surface of the fuel tank do not have the plated layer in order to make the external appearance of the coating satisfactory. On the other hand, in the case where the steel sheet is used for the case where the outer surface of the fuel tank also requires high corrosion resistance, it is preferred that the outer surface of the fuel tank have the plated layer. In the steel sheet according to the present invention, the presence and absence of the plated layer on the outer surface and the inner surface can be controlled in accordance with the use.

In order to make the outer surface into a state that does not have the plated layer, there can be employed a method not involving applying electric current to the outer side to be the non-plated surface during electroplating. Alternatively, there can be employed a method involving performing plating, and then removing the plating on the outer side to be the non-plated surface through an electrochemical method (for example, anode electrolytic treatment) or a mechanical method (for example, grinding with a brush). Further, the above-mentioned methods can be used in combination.

A contact angle on the non-plated surface (surface to be the outer surface) formed through the above-mentioned method is, in terms of a water contact angle, preferably less than 10 degrees and more preferably less than 5 degrees. In this way, the coating property is improved. In order to ensure the above contact angle, it is effective to suppress oxidation on the surface of the steel sheet, and in this point, it is desirable that a trace amount of Zn and/or Ni is present also on the non-plated surface side. It is desirable that the deposition amount be preferably 0.01 to 0.3 g/m², and more preferably 0.01 to 0.1 g/m².

Here, a base material of the steel sheet for a fuel tank according to an present embodiment is not particularly limited, and any known steel sheet can be used appropriately as long as it is a steel sheet that is generally used as a base material of a zinc-based plated steel sheet.

The Zn—Ni alloy plated layer formed on at least one surface of the steel sheet is an alloy plated layer containing at least an alloy of zinc and nickel. The Zn—Ni alloy plated layer can be formed by a known plating method such as an electroplating method.

The Zn—Ni alloy plated layer is characterized in having a crack starting from a surface layer of the plated layer (in other words, an interface between the Zn—Ni alloy plated layer and the inorganic chromate-free chemical conversion coating film) and reaching the base metal (in other words, an interface between the steel sheet, which is the base material, and the Zn—Ni alloy plated layer). Further, the inorganic chromate-free chemical conversion coating film formed over the Zn—Ni alloy plated layer is characterized in having a water contact angle on a surface of the coating film of more than or equal to 50 degrees.

It is a well-known phenomenon that the fuel corrosion resistance improves in the case where there is a crack in the Zn—Ni alloy plated layer, on the assumption that the chromate treatment is performed. Such a phenomenon can be explained through: improvement in adhesion of the coating film owing to an anchor effect of a chromate coating film entered in the crack; and an effect of preventing a new crack from being generated during press working when there is a crack in the plated layer in advance. It is presumed that such effects can also be seen in the steel sheet described in Patent Literature 8.

On the other hand, in a chromate-free chemical conversion coating film that has recently been studied, no remarkable fuel corrosion resistance-improvement effect can be expected even if there is a crack in the plated layer, and, on the contrary, the fuel corrosion resistance deteriorates. It is considered that the reason therefor is that there is no strong corrosion inhibitor such as $Cr^{6+}$, which exists in the chromate coating film.

In order to exhibit fuel corrosion resistance, in particular, satisfactory corrosion resistance under a fuel environment including an organic acid such as deteriorated gasoline and in addition dew condensation water, and also under a condition in which a part of the coating film is damaged during press working, it is necessary that all of the following be satisfied: a crack exists in the Zn—Ni alloy plated layer; the chromate-free chemical conversion coating film is inorganic; and the water contact angle on the surface of the chemical conversion coating film is more than or equal to 50 degrees.

The crack in the Zn—Ni alloy plated layer according to the present embodiment refers to a crack starting from the plated layer surface and reaching the base metal. It is assumed that function mechanisms of the crack are achieved from, in addition to the anchor effect and the prevention of a new crack from being generated during press working as described above, effects of increasing a surface area of the water-repellent inorganic chemical conversion coating film, and, owing to the increase in the surface area, protecting the plated layer and the base metal from corrosion factors in a fuel, particularly from hydrophilic corrosion factors. Note that the presence of the crack can be confirmed by observing a cross section using a scanning electron microscope (SEM).

It is necessary that the chromate-free chemical conversion coating film according to the present embodiment be an inorganic coating film. The inorganic coating film does not represent a coating film mainly containing an organic resin. Although the inorganic coating film does not exclude the containing of an organic resin, the inorganic coating film represents a coating film having the content of the organic resin (content with respect to the total solid content of the coating film) of less than 50%, preferably less than or equal to 30%, and more preferably less than or equal to 10% (including zero). In the case where the chromate-free chemical conversion coating film mainly contains an organic resin (that is, in the case where the chromate-free chemical conversion coating film is an organic coating film), the organic resin is swelled by a hydrocarbon in the fuel, the adhesion between the plated layer and the chemical conversion coating film decreases, and the corrosion starting from a crack in the plated layer also progresses. With the inorganic coating film like the chemical conversion coating film according to the present embodiment, such a swelling phenomenon can be suppressed.

It is necessary that the water contact angle on the surface of the chemical conversion coating film according to the present embodiment be more than or equal to 50 degrees. With the combined effect of the water contact angle being more than or equal to 50 degrees and the effect of a crack in the plated layer, the plated layer and the base metal can be protected from corrosion factors in a fuel, particularly from hydrophilic corrosion factors, and thus, satisfactory corrosion resistance can be obtained. The water contact angle on the surface of the chemical conversion coating film according to the present embodiment is preferably more than or equal to 55 degrees, and more preferably more than or equal to 60 degrees. Note that the upper limit of the water contact angle is not particularly defined, and, although it is preferred that the water contact angle be a value near 180 degrees which is the theoretical limit, the limit that the water contact angle can reach on the plated steel sheet according to the present embodiment is approximately 120 degrees. The water contact angle can be measured by a known method using a contact angle meter.

The inorganic chromate-free chemical conversion coating film according to the present embodiment desirably contains one or more selected from a silane coupling agent, a condensation polymer of a silane coupling agent, silica, silicate, phosphoric acid, and phosphate, and a compound of one or more metals selected from Ti, Zr, V, Mo, and W. Further, the inorganic chromate-free chemical conversion coating film according to the present embodiment desirably contains a water repellent.

Here, the water repellent according to the present embodiment represents a substance that has an action of increasing the water contact angle by being added to an inorganic chemical conversion coating film. Specific examples of the water repellent include organic resins each having a C—H bond or a C—F bond. Further preferable specific examples of the water repellent include polyolefin wax, a silicon-based resin, and a fluorine-based resin. The predetermined water contact angle can be obtained with a small amount of addition of those water repellents (for example, less than or equal to 10% with respect to the total solid content of the chemical conversion coating film), and therefore, there is no risk that the chemical conversion coating film according to the present embodiment is no longer an inorganic coating film.

It is important that, in the inorganic chromate-free chemical conversion coating film according to the present embodiment, the above-mentioned water repellents be adjusted such that the water contact angle on the surface of the chemical conversion coating film be more than or equal to 50 degrees.

To be specific, in the case where the chemical conversion coating film mainly contains one or more selected from a silane coupling agent and a condensation polymer of a silane coupling agent, since those components each have a C—H bond, a relatively high water contact angle can be easily obtained without adding a water repellent, but it is more preferred to add a water repellent. The water repellent to be added in this case is one or more selected from polyolefin wax, a silicon-based resin, and a fluorine-based resin, and it is preferred that the water repellent be added in an amount of more than or equal to 0.1% with respect to the total solid content.

Further, in the case where the chemical conversion coating film mainly contains one or more selected from silica, silicate, phosphoric acid, and phosphate, since it is generally difficult to obtain the predetermined water contact angle unless a water repellent is added, it is desirable to add a water repellent. The water repellent to be added in this case is one or more selected from polyolefin wax, a silicon-based resin, and a fluorine-based resin, and it is preferred that the water repellent be added in an amount of more than or equal to 1% with respect to the total solid content.

The deposition amount of the inorganic chromate-free chemical conversion coating film according to the present embodiment per surface is preferably 0.1 to 2 $g/m^2$, and more preferably 0.3 to 1 $g/m^2$. In the case where the deposition amount of the chemical conversion coating film per surface is less than 0.1 $g/m^2$, corrosion resistance with respect to deteriorated gasoline may decrease, and in the case where the deposition amount of the chemical conversion coating film per surface exceeds 2 $g/m^2$, the cost increases and weldability may deteriorate depending on a welding condition. The method of measuring the deposition amount of the chemical conversion coating film per surface is not particularly limited. The measurement can be performed thorough a known measurement method, and can be performed through a gravimetric method or an X-ray fluorescence method, for example. The gravimetric method used here is a method involving measuring a weight of a sample whose area is defined, then forming the chemical conversion coating film, and determining a deposition amount from the difference with a weight of the product. Further, the X-ray fluorescence method is a method involving creating in advance a calibration curve with a deposition amount-known sample by means of the gravimetric method or the like, and calculating a deposition amount from an X-ray fluorescence intensity of a sample of interest.

Here, the inorganic chromate-free chemical conversion coating film according to the present embodiment can be formed through a known method. For example, the method involves preparing application liquid containing predetermined component(s) described above, and applying the prepared application liquid over the Zn—Ni alloy plated layer through a known method such as bar coater and roll coater. Then, the obtained applied film may be heated and dried at predetermined heating temperature.

Regarding a crack in the Zn—Ni alloy plated layer according to the present embodiment, a more preferred embodiment will be described below.

The presence of the crack can be confirmed by embedding a sample in a resin, performing cross section vertical polishing, and observing a cross section using a SEM. In this case, observing a visual field of 100 μm at approximately 1000-fold magnification, it is more preferred that the number of cracks starting from the surface layer of the plated layer and reaching the base metal be more than or equal to 5 and less than or equal to 50. In the case where the number of cracks is small, for example, in the case where the number of cracks in the visual field of 100 μm is less than 5, the fuel corrosion resistance tends to decrease. On the other hand, in the case where the number of cracks is too large, for example, in the case where the number of cracks in the visual field of 100 μm exceeds 50, general corrosion resistance such as corrosion resistance with respect to a brine environment tends to decrease. In the Zn—Ni alloy plated layer according to the present embodiment, the number of cracks in the visual field of 100 μm is more preferably more than or equal to 10 and less than or equal to 40.

Moreover, in the case where cracks are observed in the above-mentioned method and a crack having the largest opening width among the cracks starting from the surface layer of the plated layer and reaching the base metal is observed at approximately 10000-fold magnification to determine the maximum width, the obtained maximum width is desirably less than 0.5 μm. In the case where the maximum width of the crack is more than or equal to 0.5 μm, general corrosion resistance such as corrosion resistance with respect to a brine environment tends to decrease.

In order to obtain the best corrosion resistance with respect to deteriorated gasoline, it is important to take into account the relationship between the number of cracks and the water contact angle on the surface of the coating film. To be specific, in the case where the number of cracks is small, it is important that the water contact angle be kept higher, and on the other hand, in the case where the number of cracks is large, satisfactory fuel corrosion resistance can be obtained in a water contact angle of a relatively wide range. As a result of conducting a detailed investigation, to be specific, the best corrosion resistance with respect to deteriorated gasoline can be obtained if the number X of cracks (in a visual field of 100 μm) and the water contact angle Y (degree(s)) on the surface of the coating film satisfy the following relationship of Expression (I).

$$Y \geq -0.18X + 56.5 \quad (I)$$

Referring to FIG. 1, the relationship shown in Expression (I) will be described. As shown in FIG. 1, in the case where the number X of cracks is small, during processing of the steel sheet, a large number of new cracks (newly generated cracks due to processing) are generated in the Zn—Ni alloy plated layer, and, accompanied by the damage to the Zn—Ni alloy plated layer, the inorganic chromate-free chemical conversion coating film is also damaged. Therefore, in order to obtain satisfactory fuel corrosion resistance, it is necessary that the water contact angle Y on the surface of the coating film be high.

On the other hand, in the case where the number X of cracks is large, during processing of the steel sheet, the pre-existent cracks reduce stress, and hence, new cracks are unlikely to be generated. Therefore, the inorganic chromate-free chemical conversion coating film is hardly damaged, and the reduction in the fuel corrosion resistance is small. Moreover, in the case where the inorganic chromate-free chemical conversion coating film is formed so as to cover the inner surfaces of the cracks, the surface area of the inorganic chromate-free chemical conversion coating film increases, and the fuel corrosion resistance further improves. It is assumed that the reason therefor is that, since the surface area of the inorganic chromate-free chemical conversion coating film increases with the increase in the number X of cracks, the effect of protecting the plated layer and the base metal from corrosion factors in a fuel, particularly from hydrophilic corrosion factors increases, even with a coating film having a relatively small contact angle Y.

In order to obtain the best characteristics in the corrosion resistance with respect to deteriorated gasoline and general corrosion resistance such as corrosion resistance with respect to a brine environment, it is advisable to satisfy Expression (I), to make the number of cracks starting from the plated surface layer and reaching the base metal more than or equal to 5 and less than 50 (in the visual field of 100 μm), and to make the maximum width of the crack less than 0.5 μm.

The deposition amount of the Zn—Ni alloy plated layer according to the present embodiment is preferably 5 to 40 g/m$^2$ per surface. In the case where the deposition amount of the Zn—Ni alloy plated layer per surface is less than 5 g/m$^2$, the corrosion resistance with respect to deteriorated gasoline tends to be insufficient. Further, in the case where the deposition amount of the Zn—Ni alloy plated layer per surface exceeds 40 g/m$^2$, although the corrosion resistance with respect to deteriorated gasoline is imparted, but it is disadvantageous in terms of cost, therefore it is not preferred. Note that, from the viewpoint of a coating property, the deposition amount of the Zn—Ni alloy plated layer per surface is preferably 0.01 to 0.5 g/m$^2$. Note that the Ni content in the Zn—Ni alloy plated layer is not particularly limited, and is preferably 9 to 14 mass %, the range in which the corrosion resistance with respect to deteriorated gasoline becomes satisfactory. Further, the Zn—Ni alloy plated layer may contain a known third component, for example, metals such as Fe, Co, Sn, and Cr, and the underneath the Zn—Ni alloy plated layer may have pre-plating of Fe and Ni, for example.

Note that the deposition amount of the Zn—Ni alloy plated layer per surface can be controlled through a quantity of electricity (amount of coulomb) in the case of using an electroplating method, for example, and can also be measured afterward. The measurement method of the deposition amount of the Zn—Ni alloy plated layer per surface is not particularly limited, and the measurement can be performed thorough a known measurement method, for example, through a gravimetric method or an X-ray fluorescence method. The gravimetric method used here is a method involving measuring a weight of a plated sample whose area is defined, dissolving only the plated layer in hydrochloric acid, and determining a deposition amount from the difference with a weight after the dissolving. Further, the X-ray fluorescence method is a method involving creating in advance a calibration curve with a deposition amount-known sample by means of the gravimetric method or the like, and calculating a deposition amount from an X-ray fluorescence intensity of a sample of interest.

The method of forming a crack in the Zn—Ni alloy plated layer according to the present embodiment is not limited, and treatment in an acidic aqueous solution after the plating is preferably used. In particular, in the case where the Zn—Ni alloy plated layer is formed by performing electroplating in an acidic plating solution, a method is appropriately used, involving cutting electricity after the plating and immersing the resultant in a plating solution in the state with no electricity. The number of cracks and the maximum width can be adjusted by a concentration of a treatment bath, temperature, or a treatment time. In the case where treatment is carried out using an acidic plating bath, the number of cracks has particularly high dependency on temperature, and, the higher the temperature, the number tends to increase. On the other hand, the crack width has high dependency on time, and, in the case where there is an attempt to suppress the crack width, the time for the treatment may be made short. In the case where the treatment is performed at high temperature for a short period of time, the number of cracks is large and the crack width is not too large. On the other hand, in the case where the treatment is performed at low temperature for a long period of time, the number of cracks is not too large, but the crack width tends to increase.

The configuration of the present invention described above relates to the surface to be the inner surface of a fuel tank, in which the fuel corrosion resistance becomes a problem. The surface to be the outer surface of the fuel tank is not particularly limited. The surface to be the outer surface of the fuel tank does not necessarily have the Zn—Ni alloy plated layer, may have the Zn—Ni alloy plated layer, and may have, in addition, the chromate-free chemical conversion coating film over the Zn—Ni alloy plated layer.

EXAMPLES

Next, the steel sheet for a fuel tank according to the present invention will be described further specifically with reference to Examples and Comparative Examples. Note that Examples shown below are merely examples of the steel sheet for a fuel tank according to the present invention, and the steel sheet for a fuel tank according to the present invention is not limited to the following examples.

<Experiment 1>

Examples 1 to 28 and Comparative Examples 1 and 2

An extra-low carbon steel sheet was used as an original sheet, a sulfuric acid acidic plating bath was used, electroplating was performed, and a Zn—Ni alloy plated layer whose deposition amount per surface was 20 g/m$^2$ and containing 10 mass % of Ni was formed. The resultant was held in the plating bath for three seconds in the state that the electricity was cut, and a predetermined plated layer-crack was formed. Note that the sulfuric acid acidic plating bath that was used was a bath of 50° C. containing 200 g/L of zinc sulfate heptahydrate, 380 g/L of nickel sulfate hexahydrate, 80 g/L of sodium sulfate, and 10 g/L of sulfuric acid. After that, each of the chromate-free chemical conversion coating films having different compositions shown in Table 1 was formed in a predetermined amount over the obtained Zn—Ni alloy plated layer. The chromate-free chemical conversion coating film was formed through application using a bar coater and drying in a hot air drying furnace (ultimate sheet temperature: 100° C.). Note that the deposition amount of the chromate-free chemical conversion coating film was measured through the X-ray fluorescence method described above.

TABLE 1

| | Solid content concentration (mass %) | | | | | | | | | | |
|---|---|---|---|---|---|---|---|---|---|---|---|
| | m1 | m2 | m3 | m4 | m5 | m6 | m7 | m8 | m9 | m10 | m11 |
| Silane coupling agent *1 | 4.7 | 3.7 | 3.1 | 4 | 4.5 | 4.5 | 4.2 | 4.7 | | 2 | |
| Silane coupling agent oligomer *2 | 88 | 85 | 62 | 75 | 85 | 85.5 | 87 | 87 | 85 | 80 | |
| Silica | | | | | | | | | 3.9 | 5 | |
| Lithium silicate | | | | | | | | | | | |
| Phosphoric acid | 5 | 4 | 3.5 | 4.3 | 4.8 | 5 | 4.9 | 5 | | | |
| Aluminum primary phosphate | | | | | | | | | | | 60 |
| Ammonium phosphate | | | | | | | | | | 1 | |
| Phosphonic acid *3 | | | | | | | | | 2 | | 30 |
| Ammonium hexafluorotitanate | 2 | 1 | 1.4 | 1.7 | 1.7 | 2 | 1.9 | 2.3 | 2 | | 3 |
| Zirconium oxycarbonate | | 1 | | | | | | | | 5 | |
| Vanadyl acetylacetonate | | | | | | | | | 5 | 3 | 5 |
| Ammonium molybdate | | | | | | | | | | 1 | |
| Tungstic acid | | | | | | | | | 2 | | 2 |
| Urethane resin *4 | | | 30 | 10 | | | | | | | |
| Ionomer resin *5 | | 5 | | | | | | | | | |
| Polyethylene wax | 0.3 | 0.3 | | 5 | 4 | 3 | 2 | 1 | 0.1 | 3 | |
| Fluorine-based resin *6 | | | | | | | | | | | |
| Total | 100 | 100 | 100 | 100 | 100 | 100 | 100 | 100 | 100 | 100 | 100 |

| | Solid content concentration (mass %) | | | | | | | | | |
|---|---|---|---|---|---|---|---|---|---|---|
| | m12 | m13 | m14 | m15 | m16 | m17 | m18 | m19 | m20 | y1 |
| Silane coupling agent *1 | | | | | | 1 | 3 | | 3 | 2 |
| Silane coupling agent oligomer *2 | | | | | | | | | 80 | |
| Silica | | | | | 4 | 5 | | 20 | 5 | 26 |
| Lithium silicate | | | | | | 80 | 80 | 70 | | |
| Phosphoric acid | | | | | 10 | | | | 1 | |
| Aluminum primary phosphate | 59 | 58.2 | 57 | 54 | 40 | | | | | |
| Ammonium phosphate | | | | | | 3 | | | 1 | 1 |
| Phosphonic acid *3 | 29 | 29.1 | 28.5 | 27 | 30 | | 2 | | | |
| Ammonium hexafluorotitanate | 4 | 2.91 | 2.85 | 2.7 | | | | | | |
| Zirconium oxycarbonate | | | | | 5 | 2 | 5 | 3 | 5 | |
| Vanadyl acetylacetonate | 4 | 4.85 | 4.75 | 4.5 | 3 | 4 | 5 | 2 | 3 | 1 |
| Ammonium molybdate | | | | | 2 | | 2 | | 1 | |
| Tungstic acid | 2 | 1.94 | 1.9 | 1.8 | 1 | | | | | |
| Urethane resin *4 | | | | | | | | | | |
| Ionomer resin *5 | | | | | | | | | | 65 |
| Polyethylene wax | 1 | 3 | 5 | 10 | 5 | 5 | 3 | 5 | | 5 |
| Fluorine-based resin *6 | 1 | | | | | | | | 1 | |
| Total | 100 | 100 | 100 | 100 | 100 | 100 | 100 | 100 | 100 | 100 |

Here, the numbers in Table 1 represent the following.
*1: 3-glycidoxypropyl trimethoxy silane
*2: condensation polymer of 3-glycidoxypropyl trimethoxy silane and 3-aminopropyltriethoxysilane in a ratio of 3:2 (molecular weight of approximately 3000)
*3: 1-hydroxy-ethylidene-1,1'-diphosphonic acid
*4: ester-based urethane resin
*5: Na neutralized ionomer resin
*6: tetrafluoroethylene-perfluoroalkyl vinyl ether copolymer Comparative Example 3

Preparation was performed in the same manner as described above, except that the chemical conversion coating film was not formed.

Comparative Examples 4 to 7

Each preparation was performed in the same manner as described above, except that the treatment of being immersed in a plating bath in the state with no electricity after the Zn—Ni alloy plating was not performed.

Comparative Example 8

Preparation was performed in the same manner as described above, except that electrogalvanizing was used instead of Zn—Ni alloy plating.

[Observation on Plated Layer-Crack]

Each of the prepared samples was embedded in a resin, cross section vertical polishing was performed, and the cross section was observed using a SEM. A visual field of 100 μm was observed at 1000-fold magnification, and the number of cracks starting from the surface layer of the plated layer and reaching the base metal was counted. Moreover, a crack having the largest opening width among the cracks starting from the surface layer of the plated layer and reaching the base metal in the visual field was observed using the SEM at approximately 10000-fold magnification to measure the maximum width.

[Water Contact Angle]

A contact angle meter (DM-901 manufactured by Kyowa Interface Science Co., Ltd) was used, 3 μl of ion exchanged water were dripped under 25° C. atmosphere, and a static contact angle after 60 seconds was measured.

[Corrosion Resistance with Respect to Deteriorated Gasoline]

Each of the prepared samples was molded in a cylinder shape having an inside diameter of 50 mm and a depth of 35 mm, which imitates a fuel tank. After removing oil through grease removing treatment, a flaw that reaches up to the base metal was made by a cutter on the inner surface base (which imitates a flaw caused by press working). Then, test liquid that imitates the deteriorated gasoline (gasoline containing 100 ppm of formic acid, 300 ppm of acetic acid, 100 ppm of chloride ions, 1.0 capacity % of water) was enclosed, and was retained at 40° C. for two months. After that, rust was removed, a maximum reduction in sheet thickness (mm) due to corrosion was measured.

Table 2 shows evaluation results for each sample of a state of a plated layer-crack, a type of a chemical conversion coating film that was used, a deposition amount of a chemical conversion, a water contact angle, and corrosion resistance with respect to deteriorated gasoline. Note that, in Table 2, the evaluation results of the corrosion resistance with respect to deteriorated gasoline can be determined as satisfactory in the case where the maximum reduction in sheet thickness was less than 0.05 mm.

As is clear from Table 2, since Comparative Example 1 had a small water contact angle and was out of the range of the present invention, the corrosion resistance with respect to deteriorated gasoline was poor. Comparative Example 2 had a high water contact angle, but the coating film was organic, which was out of the range of the present invention, and therefore, the corrosion resistance with respect to deteriorated gasoline was poor. In each of Comparative Example 4 and Comparative Example 5, although the water contact angle was within the range of the present invention, the plated layer did not have a crack, and therefore, the corrosion resistance with respect to deteriorated gasoline was poor.

Comparing Comparative Example 1 and Comparative Example 6 with each other, it was found that, in coating films each having a small water contact angle which was out of the range of the present invention, the corrosion resistance deteriorated with the formation of the plated layer-crack. In the same manner, comparing Comparative Example 2 and Comparative Example 7 with each other, it was found that, in organic coating films which were out of the range of the present invention, the corrosion resistance deteriorated with the formation of the plated layer-crack.

As above, it was found that Examples of the present invention each having a combination that satisfied all plated

TABLE 2

| | | Zn—Ni alloy plated layer | | Chemical conversion treated coating film | | Water contact angle (degrees) | Corrosion resistance with respect to deteriorated gasoline (mm) | Remarks |
|---|---|---|---|---|---|---|---|---|
| | | Number of cracks | Maximum width (μm) | Type of chemical conversion coating film | Deposition amount (g/m$^2$) | | | |
| Example | 1 | 12 | 0.3 | m1 | 0.7 | 53 | 0.01 | |
| | 2 | 12 | 0.3 | m2 | 0.7 | 57 | 0 | |
| | 3 | 12 | 0.3 | m3 | 0.7 | 60 | 0.01 | |
| | 4 | 12 | 0.3 | m4 | 0.7 | 71 | 0 | |
| | 5 | 12 | 0.3 | m5 | 0.7 | 70 | 0 | |
| | 6 | 12 | 0.3 | m6 | 0.7 | 68 | 0 | |
| | 7 | 12 | 0.3 | m7 | 0.7 | 64 | 0 | |
| | 8 | 12 | 0.3 | m8 | 0.7 | 59 | 0 | |
| | 9 | 12 | 0.3 | m9 | 0.7 | 50 | 0.04 | |
| | 10 | 12 | 0.3 | m10 | 0.7 | 69 | 0 | |
| | 11 | 12 | 0.3 | m12 | 0.7 | 59 | 0 | |
| | 12 | 12 | 0.3 | m13 | 0.7 | 55 | 0 | |
| | 13 | 12 | 0.3 | m14 | 0.7 | 56 | 0 | |
| | 14 | 12 | 0.3 | m15 | 0.7 | 58 | 0 | |
| | 15 | 12 | 0.3 | m16 | 0.7 | 61 | 0 | |
| | 16 | 12 | 0.3 | m17 | 0.7 | 62 | 0 | |
| | 17 | 12 | 0.3 | m18 | 0.7 | 63 | 0 | |
| | 18 | 12 | 0.3 | m19 | 0.7 | 60 | 0 | |
| | 19 | 12 | 0.3 | m20 | 0.7 | 91 | 0 | |
| | 20 | 12 | 0.3 | m1 | 0.5 | 53 | 0.01 | |
| | 21 | 12 | 0.3 | m1 | 1 | 53 | 0 | |
| | 22 | 12 | 0.3 | m1 | 1.5 | 53 | 0 | |
| | 23 | 12 | 0.3 | m5 | 0.3 | 70 | 0 | |
| | 24 | 12 | 0.3 | m5 | 1.2 | 70 | 0 | |
| | 25 | 12 | 0.3 | m5 | 2 | 70 | 0 | |
| | 26 | 12 | 0.3 | m16 | 0.4 | 61 | 0 | |
| | 27 | 12 | 0.3 | m16 | 0.9 | 61 | 0 | |
| | 28 | 12 | 0.3 | m16 | 1.8 | 61 | 0 | |
| Comparative Example | 1 | 12 | 0.3 | m11 | 0.7 | 20 | 0.2 | |
| | 2 | 12 | 0.3 | y1 | 0.7 | 78 | 0.17 | Organic chromate-free coating film |
| | 3 | 12 | 0.3 | none | — | 5 | 0.36 | |
| | 4 | 0 | — | m1 | 0.7 | 53 | 0.1 | |
| | 5 | 0 | — | m5 | 0.7 | 70 | 0.09 | |
| | 6 | 0 | — | m11 | 0.7 | 20 | 0.14 | |
| | 7 | 0 | — | y1 | 0.7 | 78 | 0.09 | Organic chromate-free coating film |
| | 8 | — | — | m5 | 0.7 | 69 | 0.19 | Electrogalvanizing | layer-crack, inorganic coating film, and water contact angle could obtain satisfactory characteristics.

<Experiment 2>

Examples 29 to 81

An extra-low carbon steel sheet was used as an original sheet, a sulfuric acid acidic plating bath was used, electroplating was performed, and a Zn—Ni alloy plated layer whose deposition amount per surface was 20 g/m² and containing 10 mass % of Ni was formed. A predetermined plated layer-crack was formed by varying temperature and time during immersion in the plating bath in the state that the electricity was cut. The plating bath that was used was the same as the plating bath used in Experiment 1, and the temperature was varied between 50 to 65° C., and the immersion time was varied between 1 to 5 seconds. After that, each of the chromate-free chemical conversion coating films having different compositions shown in Table 1 was formed in a predetermined amount in the same manner as in Experiment 1. Further, the deposition amount of the chromate-free chemical conversion coating film was measured through the X-ray fluorescence method described above.

The evaluations were performed in the same manner as in Experiment 1, except that in this Experiment, SST corrosion resistance was additionally evaluated.

[SST Corrosion Resistance]

A back surface and an edge of each of the prepared samples were sealed and a salt spray test defined in JISZ2371 was performed for 72 hours to measure an area proportion (%) of white rust occurrence.

Table 3 shows evaluation results for each sample of a state of a plated layer-crack, a type of a chemical conversion coating film that was used, a deposition amount of a chemical conversion, a water contact angle, corrosion resistance with respect to deteriorated gasoline, and SST corrosion resistance. Note that the evaluation results of the corrosion resistance with respect to deteriorated gasoline can be determined as satisfactory in the case where the maximum reduction in sheet thickness was less than 0.05 mm. Further, the SST corrosion resistance can be determined as satisfactory in the case where the rate of white rust occurrence was less than 5%.

TABLE 3

| | | Zn—Ni alloy plated layer | | Chemical conversion treated coating film | | | Corrosion resistance with respect to deteriorated gasoline (mm) | SST corrosion resistance (%) |
|---|---|---|---|---|---|---|---|---|
| | | Number of cracks | Maximum width (μm) | Type of chemical conversion coating film | Deposition amount (g/m²) | Water contact angle (degrees) | Satisfy Expression (I) | | |
| Example | 29 | 5 | 0.2 | m1 | 0.8 | 53 | No | 0.02 | 0 |
| | 30 | 5 | 0.2 | m5 | 0.8 | 70 | Yes | 0 | 0 |
| | 31 | 5 | 0.2 | m6 | 0.8 | 68 | Yes | 0 | 0 |
| | 32 | 5 | 0.2 | m7 | 0.8 | 64 | Yes | 0 | 0 |
| | 33 | 5 | 0.2 | m8 | 0.8 | 59 | Yes | 0 | 0 |
| | 34 | 5 | 0.2 | m9 | 0.8 | 50 | No | 0.04 | 0 |
| | 35 | 5 | 0.2 | m13 | 0.8 | 55 | No | 0.01 | 0 |
| | 36 | 5 | 0.2 | m14 | 0.8 | 56 | Yes | 0 | 0 |
| | 37 | 5 | 0.2 | m17 | 0.8 | 62 | Yes | 0 | 0 |
| | 38 | 50 | 0.4 | m1 | 0.8 | 53 | Yes | 0 | 0.5 |
| | 39 | 50 | 0.4 | m5 | 0.8 | 70 | Yes | 0 | 0 |
| | 40 | 50 | 0.4 | m6 | 0.8 | 68 | Yes | 0 | 0 |
| | 41 | 50 | 0.4 | m7 | 0.8 | 64 | Yes | 0 | 0 |
| | 42 | 50 | 0.4 | m8 | 0.8 | 59 | Yes | 0 | 0 |
| | 43 | 50 | 0.4 | m9 | 0.8 | 50 | Yes | 0 | 0.5 |
| | 44 | 50 | 0.4 | m13 | 0.8 | 55 | Yes | 0 | 0 |
| | 45 | 50 | 0.4 | m14 | 0.8 | 56 | Yes | 0 | 0 |
| | 46 | 50 | 0.4 | m17 | 0.8 | 62 | Yes | 0 | 0 |
| | 47 | 38 | 0.4 | m1 | 0.8 | 53 | Yes | 0 | 0 |
| | 48 | 38 | 0.4 | m5 | 0.8 | 70 | Yes | 0 | 0 |
| | 49 | 38 | 0.4 | m6 | 0.8 | 68 | Yes | 0 | 0 |
| | 50 | 38 | 0.4 | m7 | 0.8 | 64 | Yes | 0 | 0 |
| | 51 | 38 | 0.4 | m8 | 0.8 | 59 | Yes | 0 | 0 |
| | 52 | 38 | 0.4 | m9 | 0.8 | 50 | Yes | 0 | 0 |
| | 53 | 38 | 0.4 | m13 | 0.8 | 55 | Yes | 0 | 0 |
| | 54 | 38 | 0.4 | m14 | 0.8 | 56 | Yes | 0 | 0 |
| | 55 | 38 | 0.4 | m17 | 0.8 | 62 | Yes | 0 | 0 |
| | 56 | 15 | 0.3 | m1 | 0.8 | 53 | No | 0.01 | 0 |
| | 57 | 15 | 0.3 | m5 | 0.8 | 70 | Yes | 0 | 0 |
| | 58 | 15 | 0.3 | m6 | 0.8 | 68 | Yes | 0 | 0 |
| | 59 | 15 | 0.3 | m7 | 0.8 | 64 | Yes | 0 | 0 |
| | 60 | 15 | 0.3 | m8 | 0.8 | 59 | Yes | 0 | 0 |
| | 61 | 15 | 0.3 | m9 | 0.8 | 50 | No | 0.03 | 0 |
| | 62 | 15 | 0.3 | m13 | 0.8 | 55 | Yes | 0 | 0 |
| | 63 | 15 | 0.3 | m14 | 0.8 | 56 | Yes | 0 | 0 |
| | 64 | 15 | 0.3 | m17 | 0.8 | 62 | Yes | 0 | 0 |
| | 65 | 29 | 0.3 | m1 | 0.8 | 53 | Yes | 0 | 0 |
| | 66 | 29 | 0.3 | m5 | 0.8 | 70 | Yes | 0 | 0 |
| | 67 | 29 | 0.3 | m6 | 0.8 | 68 | Yes | 0 | 0 |
| | 68 | 29 | 0.3 | m7 | 0.8 | 64 | Yes | 0 | 0 |
| | 69 | 29 | 0.3 | m8 | 0.8 | 59 | Yes | 0 | 0 |
| | 70 | 29 | 0.3 | m9 | 0.8 | 50 | No | 0.02 | 0 |
| | 71 | 29 | 0.3 | m13 | 0.8 | 55 | Yes | 0 | 0 |
| | 72 | 29 | 0.3 | m14 | 0.8 | 56 | Yes | 0 | 0 |

TABLE 3-continued

| | Zn—Ni alloy plated layer | | Type of chemical conversion coating film | Chemical conversion treated coating film | | | Corrosion resistance with respect to deteriorated gasoline (mm) | SST corrosion resistance (%) |
|---|---|---|---|---|---|---|---|---|
| | Number of cracks | Maximum width (μm) | | Deposition amount (g/m$^2$) | Water contact angle (degrees) | Satisfy Expression (I) | | |
| 73 | 29 | 0.3 | m17 | 0.8 | 62 | Yes | 0 | 0 |
| 74 | 30 | 0.5 | m1 | 0.8 | 53 | Yes | 0 | 4 |
| 75 | 30 | 0.5 | m5 | 0.8 | 70 | Yes | 0 | 2 |
| 76 | 30 | 0.5 | m6 | 0.8 | 68 | Yes | 0 | 2 |
| 77 | 30 | 0.5 | m7 | 0.8 | 64 | Yes | 0 | 2 |
| 78 | 40 | 0.7 | m1 | 0.8 | 53 | Yes | 0 | 4.5 |
| 79 | 40 | 0.7 | m5 | 0.8 | 70 | Yes | 0 | 2 |
| 80 | 40 | 0.7 | m6 | 0.8 | 68 | Yes | 0 | 3 |
| 81 | 40 | 0.7 | m7 | 0.8 | 64 | Yes | 0 | 3 |

As is clear from Table 3, Examples of the present invention each showed satisfactory characteristics.

In particular, regarding the corrosion resistance with respect to deteriorated gasoline, each of Examples that satisfies Expression (I) had a reduction in sheet thickness of 0 in the test of corrosion resistance with respect to deteriorated gasoline, which exhibited particularly excellent corrosion resistance with respect to deteriorated gasoline. Further, each of Examples having a crack width of less than 0.5 μm had a rate of white rust occurrence in the SST corrosion resistance of less than 1%, which exhibited excellent SST corrosion resistance. In particular, in the case where the crack width was less than 0.5 μm and the number of cracks was less than 50, the rate of white rust occurrence in the SST corrosion resistance was zero under any condition, which was particularly excellent.

As described above, each of Examples that satisfies Expression (I), has the number of cracks of more than or equal to 5 and less than 50, and has the crack width of less than 0.5 μm was particularly excellent in the corrosion resistance with respect to deteriorated gasoline and the SST corrosion resistance.

<Experiment 3>

Examples 82 to 89

Each of the surfaces to be the inner surface of a fuel tank was prepared in the same manner as in Example 1, but each of the surfaces to be the outer surface of a fuel tank was varied. In Example 82, the outer surface was not provided with a coating film. In each of Examples 83 and 84, the plating on the surface to be the outer surface was completely removed through grinding with a brush. After that, in Example 83, a predetermined coating film was applied. In each of Examples 85 to 89, on the outer surface from which the plating was completely removed through the above method, predetermined amounts of Zn and Ni were deposited again through electroplating.

Performance evaluation was carried out as follows.
(Coating Property)

The coating property of the surface to be the outer surface of a fuel tank was evaluated. In the same manner as the ordinary outer surface of the fuel tank for an automobile or a motorcycle, pre-coating treatment (zinc phosphate treatment) and electrodeposition were performed, and the external appearance was evaluated by visual observation. Example of an acceptable level was evaluated as "Satisfactory", and Example of remarkably uniformly fine was evaluated as "Excellent".

(Coating Property after Storage)

To the prepared sample, rust-resistant oil (NOX-RUST 530, manufactured by Parker Industries, Inc.) was applied extremely slightly (approximately 0.1 g/m$^2$), and then the resultant was packed in a manner that the surface to be the inner surface and the surface to be the outer surface came into contact with each other so that the state looked like a coil. Using a sample after stored in 50° C. 98% RH environment for one month, the same coating as in the coating property evaluation was performed, and the evaluation was performed using the same criteria (Weldability)

The surfaces to be the inner surfaces of fuel tanks were placed together and seam welding was performed. A range of current in which an appropriate nugget can be obtained was determined by changing the welding current. The conditions are as follows.

Electrode: a disc-shaped electrode made of a Cu—Cr alloy, in which a cross section at a central part had a radius of 15 mm and a width of 4.5 mm and a cross section at an end part had a radius of 4 mm and a width of 8 mm Welding method: piling of two sheets, lap seam welding Welding pressure: 400 kgf (note that 1 kgf is approximately 9.8 N)

Welding time: 2/50 sec on, 1/50 sec off

Cooling: inner part water cooled, and outer part water cooled

Welding speed: 2.5 m/min

The results are shown in Table 4. As is clear from Table 4, Examples of the present invention each showed satisfactory characteristics. Also, it was found that the coating property, the coating property after storage, and the weldability of the steel sheet particularly improved in the case where the total deposition amount of Zn and Ni was 0.01 to 0.5 g/m$^2$ (Examples 85 to 88).

TABLE 4

| | Deposition amount on outer surface side | | Coating film on outer surface side | | Outer surface performance | | | |
|---|---|---|---|---|---|---|---|---|
| | Zn | Ni | Type | Deposition amount | Water contact angle | Coating property | Coating property after storage | Weldability |
| Example 82 | 18 | 2 | — | — | Less than 5 | Satisfactory | Satisfactory | 3.0 kA |
| Example 83 | 0 | 0 | m1 | 0.7 | 53 | Satisfactory | Satisfactory | 3.5 kA |
| Example 84 | 0 | 0 | — | — | 10 | Satisfactory | Satisfactory | 3.7 kA |
| Example 85 | 0.5 | 0 | — | — | Less than 5 | Excellent | Excellent | 3.7 kA |
| Example 86 | 0 | 0.1 | — | — | Less than 5 | Excellent | Excellent | 3.7 kA |
| Example 87 | 0.2 | 0.1 | — | — | Less than 5 | Excellent | Excellent | 3.7 kA |
| Example 88 | 0 | 0.01 | — | — | Less than 5 | Excellent | Excellent | 3.7 kA |
| Example 89 | 1.0 | 0 | — | — | Less than 5 | Satisfactory | Satisfactory | 3.7 kA |

The preferred examples of the present invention have been described above, whilst the present invention is not limited to the above examples. A person skilled in the art may find various alterations and modifications within the scope of the appended claims, and it should be understood that they will naturally come under the technical scope of the present invention.

INDUSTRIAL APPLICABILITY

The present invention is industrially useful, because the present invention can provide the steel sheet for a fuel tank under an environment in which various fuels exist, the fuels including a fuel containing an organic acid such as deteriorated gasoline and a fuel containing dew condensation water in addition to an organic acid.

The present invention provides the steel sheet having different surface states between the inner and outer surfaces, by making the surface to be the outer surface of the fuel tank to be a base metal and making the surface to be the inner surface of the fuel tank to be the chromate-free chemical conversion coating film. Such a steel sheet according to the present invention has every performance necessary from the production of the fuel tank to the using of the fuel tank: (i) excellent workability that is necessary during processing and welding of the steel sheet to make the steel sheet into a tank shape; (ii) excellent coating property that is necessary during coating of the processed tank to enhance the visual quality of the external appearance; and (iii) excellent corrosion resistance that is necessary for using the produced tank for a long time.

The steel sheet according to the present invention also has an effect that is not conventionally achieved in the point that the surface states that are different between the inner and outer surfaces interact with each other and differences in performances between the inner and outer surfaces can be further exhibited. To be specific, since a surplus of the coating (oil) applied to the base metal on the outer surface of the fuel tank is adsorbed on the chromate-free chemical conversion coating film on the inner surface of the fuel tank, the coating property of the outer surface improves.

The invention claimed is:

1. A steel sheet for a fuel tank, comprising:
    a base metal as a base material;
    a Zn—Ni alloy plated layer having a deposition amount of 5 g/m² or more placed on one surface of the base metal; and
    an inorganic chromate-free chemical conversion coating film placed over the Zn—Ni alloy plated layer on the one surface, wherein
    the Zn—Ni alloy plated layer has cracks starting from an interface between the Zn—Ni alloy plated layer and the inorganic chromate-free chemical conversion coating film and reaching an interface between the Zn—Ni alloy plated layer and the base metal, and
    a water contact angle on a surface of the inorganic chromate-free chemical conversion coating film is more than or equal to 50 degrees, and wherein
    a surface opposite to the one surface has neither the Zn—Ni alloy plated layer nor the inorganic chromate-free chemical conversion coating film, wherein
    a total deposition amount of Zn and Ni on the surface having neither the Zn—Ni alloy plated layer nor the inorganic chromate-free chemical conversion coating film is 0.01 to 0.5 g/m².

2. The steel sheet for a fuel tank according to claim 1, wherein
    a water contact angle on the surface having neither the Zn—Ni alloy plated layer nor the inorganic chromate-free chemical conversion coating film is less than 10 degrees.

3. The steel sheet for a fuel tank according to claim 1, wherein
    the inorganic chromate-free chemical conversion coating film contains one or more selected from a silane coupling agent, a condensation polymer of a silane coupling agent, silica, silicate, phosphoric acid, and phosphate, and a compound of one or more metals selected from Ti, Zr, V, Mo, and W.

4. The steel sheet for a fuel tank according to claim 1, wherein
    the inorganic chromate-free chemical conversion coating film contains a water repellent.

5. The steel sheet for a fuel tank according to claim 4, wherein
    the water repellent is one or more selected from polyolefin wax, a silicon-based resin, and a fluorine-based resin.

6. The steel sheet for a fuel tank according to claim 1, wherein
    in the case where a cross section of the Zn—Ni alloy plated layer is observed, the number of the cracks in a visual field of 100 μm is more than or equal to 5 and less than or equal to 50.

7. The steel sheet for a fuel tank according to claim 6, wherein
    the number X of the cracks in a visual field of 100 μm obtained by observing the cross section of the Zn—Ni alloy plated layer and the water contact angle Y (degrees) satisfy a relationship represented by the following formula (I), $$Y \geq -0.18X + 56.5 \qquad (I).$$

8. The steel sheet for a fuel tank according to claim 7, wherein a maximum width of a the cracks is less than 0.5 µm.

* * * * *